Dec. 10, 1963  E. D. CARTER  3,113,385
HEIGHT GAUGE
Filed Dec. 5, 1960  4 Sheets-Sheet 2
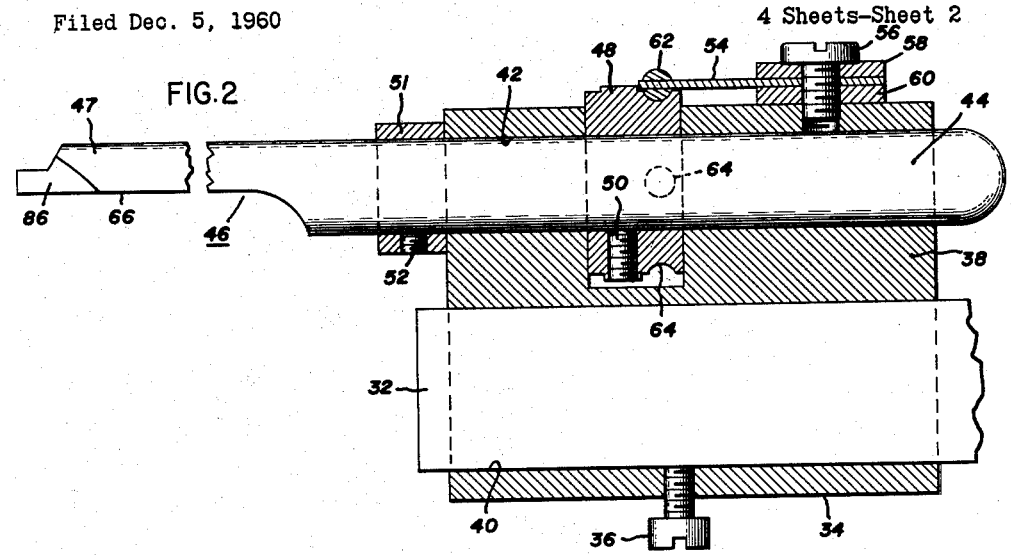
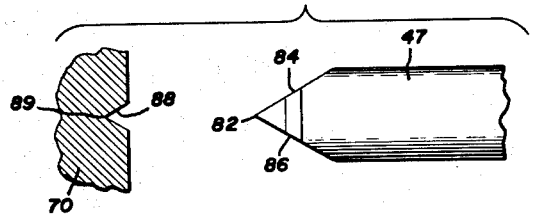
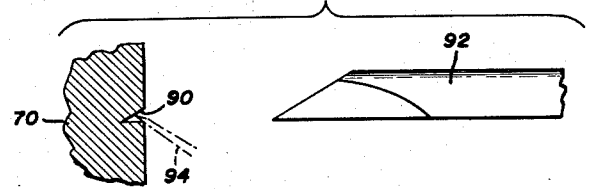
INVENTOR:
EDWARD D. CARTER,
BY *A. Emmett Thompson*
HIS ATTORNEY.

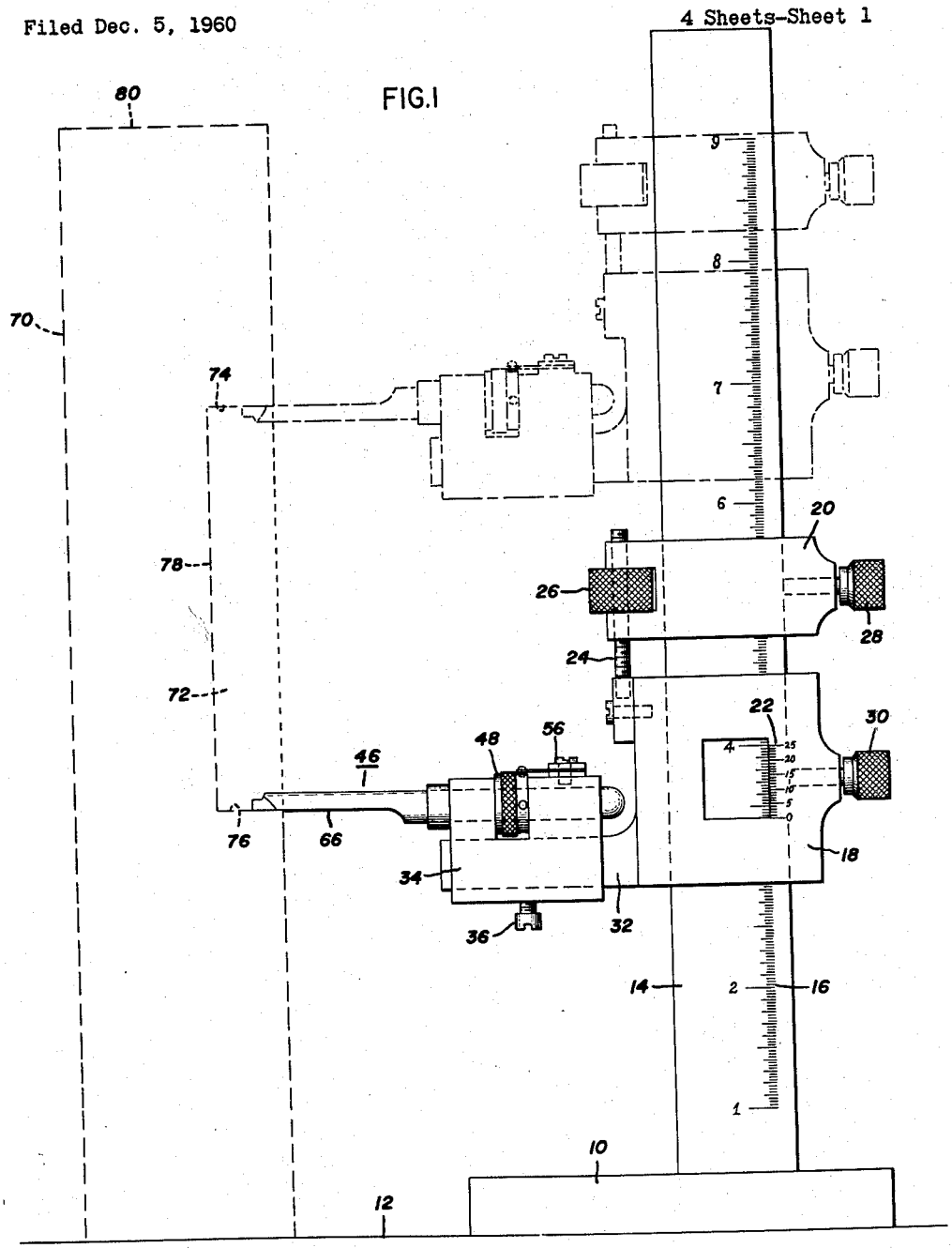

Dec. 10, 1963  E. D. CARTER  3,113,385
HEIGHT GAUGE
Filed Dec. 5, 1960  4 Sheets-Sheet 3
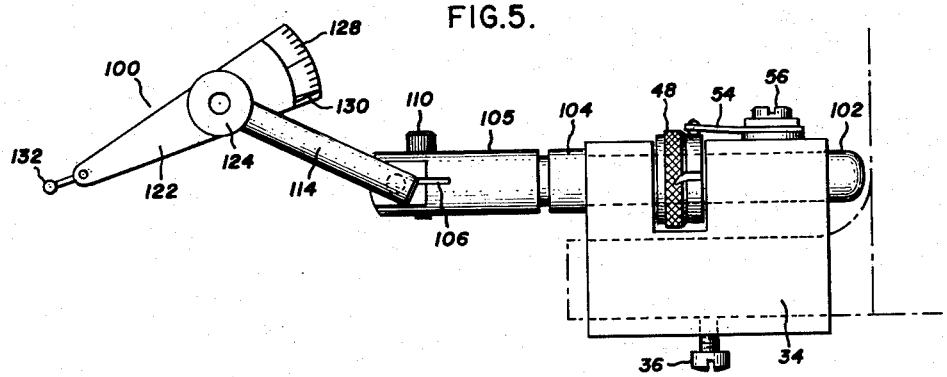
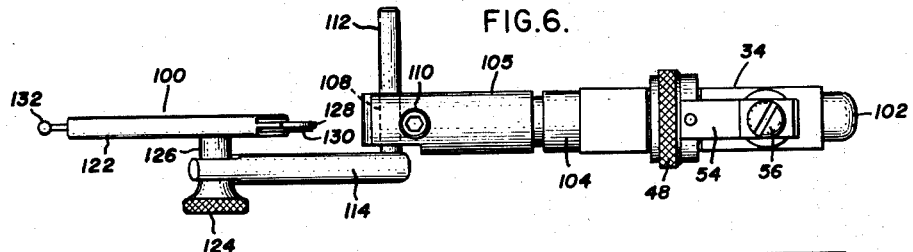
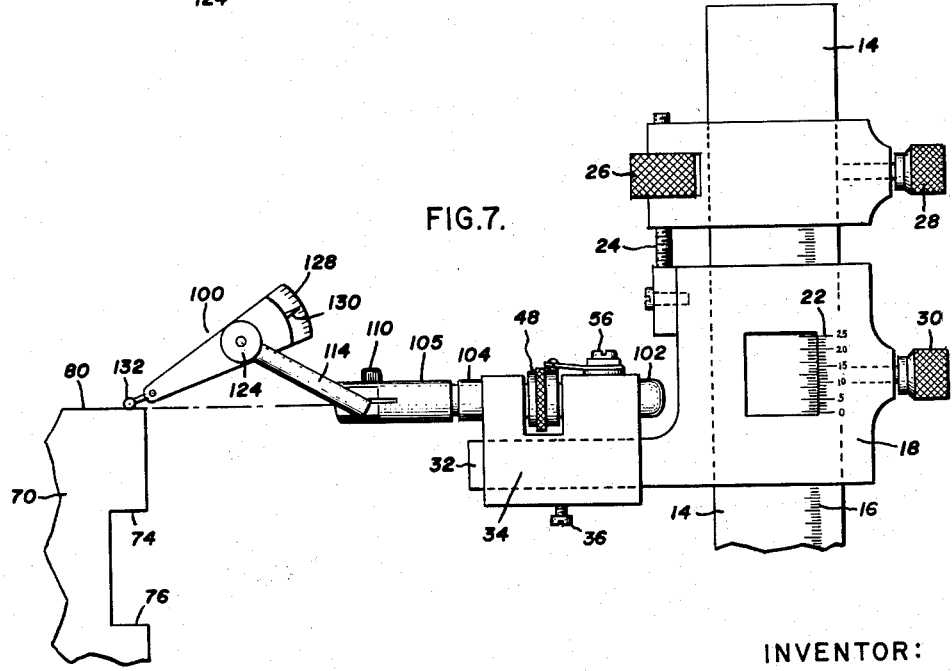
INVENTOR:
EDWARD D. CARTER,
BY *D. Emmett Thompson*
HIS ATTORNEY.

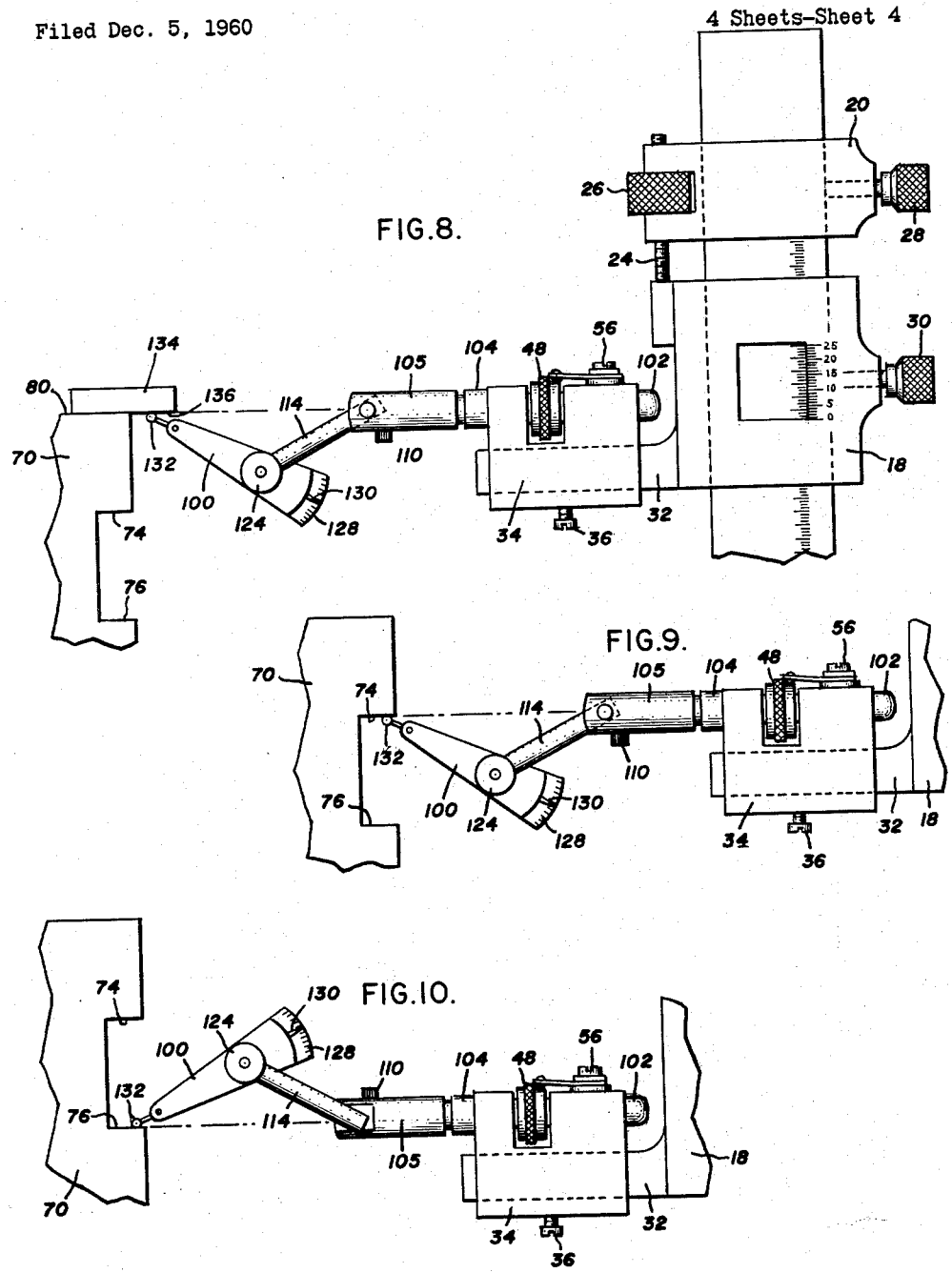

United States Patent Office  3,113,385
Patented Dec. 10, 1963

3,113,385
HEIGHT GAUGE
Edward D. Carter, 390 Russell St., Chittenango, N.Y.
Filed Dec. 5, 1960, Ser. No. 73,845
3 Claims. (Cl. 33—169)

This invention relates to and has as a general object a new and improved height gauge.

In height gauges heretofore proposed, the marking or indicating tool carried by the gauge has been so mounted that to measure or mark undercut surfaces, or the like, it was necessary to remove the tool, and reverse the position of the tool, and then remount the tool.

Accordingly, it is a more specific object of this invention to provide a height gauge having a new and improved tool mounting means whereby the tool may be rotated through a full circle to perform a series of markings or measurements.

In addition it is a further specific object of this invention to provide a new and improved scriber for a height gauge and means for mounting the scriber on the height gauge whereby the scriber may be rotated through a full circle to measure or mark work pieces having various types of surfaces, contours or shapes.

In addition it is an object of this invention to provide a new and improved scriber having a scribing point formed in a manner which results in improved marking of the work pieces.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a side elevational view of a preferred embodiment of the invention.

FIGURE 2 is a fragmentary cross sectional view of the tool holder shown in FIGURE 1 taken on an enlarged scale.

FIGURE 3 is a fragmentary view of a plan of the improved scriber of this invention showing the scriber mark formed in the work pieces by the improved scriber.

FIGURE 4 is a view similar to FIGURE 3 of the prior art scribers showing the marking affected thereby.

FIGURE 5 is a fragmentary elevational view showing an indicator mounted in the improved tool holder.

FIGURE 6 is a plan view of FIGURE 5.

FIGURES 7, 8, 9 and 10 are views in the nature of a flow sheet illustrating the various steps carried out in utilizing the indicator with the tool holder comprising the preferred form of the invention.

In FIGURE 1, the height gauge comprises a base 10 which is shown resting on a surface plate 12 and the base 10 has a calibrated scale 14 upstanding thereon. The calibrations on the standard 14 are generally indicated by the reference numeral 16 and may take any suitable or desired form. Mounted on the standard 14 in slidable fashion is a slide or saddle 18 which is carried by a vernier slide 20. The saddle 18 is formed with a vernier scale 22 and the saddle 18 is connected to the vernier slide 20 by means of the usual vernier screw 24, having an operating wheel 26 and the saddle 18 and slide 20 may be fixed in selected positions of vertical adjustment on the standard 14 by means of the conventional set screws 28 and 30. This portion of the height gauge is conventional and comprises no part of the invention.

Formed on the forward side of the saddle 18 and extending outwardly therefrom is an arm 32 on which a tool holder 34 is removably mounted by means of the set screw 36. The tool holder is shown in detail in FIGURE 2, and comprises a block 38 in which a rectangular aperture 40 is formed and through which the arm 32 is received. A cylindrical bore 42 is formed in the upper portion of block 38 to receive the cylindrical portion 44 of a tool, generally indicated by the reference numeral 46. As shown in FIGURE 2, this tool comprises a scriber 47, but as will be understood the tool may be of any desired type. The cylindrical portion 44 is received in the bore 42 and passes through a wheel 48 which is affixedly mounted to the cylindrical portion 44 by means of a threaded set screw, or the like, 50, all whereby the cylindrical portion 44 and hence, the tool 46, may be rotated through a full circle merely by rotating the wheel 48. A collar 51 is affixed to the tool by any suitable means such as a set screw 52 to limit the amount of axial insertion of the portion 44 in the bore 42 of the block 38.

The tool 46 is releasably fixed in selected portions of rotation about the center line of rotation by means of a detent arrangement comprising a leaf spring 54 affixed by a screw 56 between a pair of blocks 58 and 60. The outer end of this spring carries a ball 62 which cooperates with a plurality of semicircular depressions 64 formed in a plurality of circumferentially spaced apart points about the periphery of the wheel 48 whereby when the ball 62 is received in a selected one of the depressions 64, the tool 46 will be releasably fixed in that position.

As best seen in FIGURE 2, the working surface 66 of the scriber, shown in FIGURE 2, is ground to the center line of rotation of the cylindrical portion 44 whereby the working surface 66 will be positioned on the center line regardless of the orientation or rotation of the tool 46. This is highly advantageous in that it permits a variety of scribing or measuring operations to be performed without any necessity for removing or remounting the tool 46 in the tool holder 34.

For example, indicated to the left of FIGURE 1 is a relatively simple work piece shown in dashed lines and generally indicated by the reference numeral 70. The work piece 70 is positioned on the surface plate 12 and is formed with a notched-out portion 72 comprising an upper surface 74, and a lower surface 76 joined by the intermediate surface 78. If, for example, it is desired to scribe the work piece 70 for removal of the portion 72, according to predetermined dimensions having reference to the upper edge 80 of the work piece 70, the following series of operations may be performed with the new and improved height gauge comprising the invention.

The vernier and saddle 18 and 20 are released to permit the working surface 66 of the scriber to be positioned on the upper surface 80 of the work piece 70, and a first reading on the calibrated scale is taken by means of the vernier scale 22 in the well known manner. Now, by referring to the predetermined dimensions, the position of the scribing line 74 may be located by appropriately positioning the saddle 18 on the calibrated scale 16 on the standard 14. The scriber may then be rotated to its proper position for scribing, as illustrated in FIGURE 3, and a scribing line formed on the work piece 70. Next and in the same manner, the scribing line 76 may be formed on the work piece 70. After this, the portion 72 may be suitably removed by a machining operation, after which, the work piece 70 may be checked by the scriber in the following manner.

The position of the surface 76 relative to the upper surface 80 may first be determined by positioning the working surface 66 of the scriber thereon and taking a first reading on the scale 16. Next, the working surface 66 of the scriber may be rotated through 180°, and the scriber may be moved to the position shown in dotted lines in FIGURE 1 to move the surface 66 into engagement with the undercut surface 74. When placed in this position, a second reading may be taken on the scale 16 which will give the distance of the surface 74 from the surface 80. As will be obvious, this series of operations may be performed due to the fact that the scriber is mounted for rotation in the tool holder 34 and because the working surface 66 is positioned on the center line of rotation so that a reading may be taken in cooperation with the scale 16 in any position of rotation of the scriber.

Referring now to FIGURES 3 and 4, the improved formation of the scriber will now be described. As shown in FIGURE 3 the scriber 47 is rotated 90° from the position shown in FIGURE 2, and the scribing point 82 is positioned on the center line of the scriber 47, and is formed by a pair of converging surfaces 84 and 86 having an included angle therebetween. An included angle of 60 degrees has been found in practice to be most satisfactory, but any suitable included angle between the surfaces 84 and 86 may be utilized. As seen to the left of FIGURE 3, the scribing mark formed by the scriber 47 in the work piece 70 is shown greatly exaggerated for purposes of illustration and take the form of a V-shaped groove due to the formation of the scribing point 82 by the converging surfaces 84 and 86. This type of scribing mark places the reference line in the center of the mark as at 89 with an equal amount of material removed from each side of the reference line. This permits the leg of a compass, for example, to be positioned in the groove and allows the compass to be rotated through a full circle without displacing the leg from the apex of the V-shaped groove 88. Such is not the case, however, with scribing marks formed by conventional scribers. FIGURE 4 illustrates the conventional scribing mark 90 in a work piece 70 formed by a conventional scriber 92. Such conventional scribing marks 90 have the defect that when a compass point, as is indicated by the dashed lines 94, is positioned in the groove 90, the point of the compass 94 will rise on to tapered side wall of the groove 90, thus, rendering the compass measurements inaccurate by reason of displacement of the point of the leg 94 from reference line 89, at the apex or bottom of the groove 90. However, the groove 88 formed by the improved scriber 47 will not displace a compass leg and hence, will result in more accurate measurements.

In FIGURES 5 and 6, an indicator, generally indicated by the reference numeral 100, of any conventional type, is mounted in the tool holder 34 in the following manner.

A cylindrical rod 102 is received in the tool holder 34 in the same manner as described in connection with FIGURES 1 and 2, and is formed with a collar 104 similar to the collar 50 to limit insertion of the rod 102 in the holder 34. The forward end of the rod 102 has an enlarged portion 105, which is axially split, as at 106, and an aperture 108 passes through the forward portion and intersects the slot 106. A threaded screw or the like, 110, passes through the fingers formed by slot 106 to permit the fingers to be clamped on to the cylindrical portion 112 of an extension piece 114. As will be obvious from FIGURE 6, the portion 112 may be affixed in selected positions of adjustment in the portion 105 in order to permit indicators 100 of different styles to be mounted on the rod 102 so that the center line of the indicator 100 in the flat plane of the indicator may be positioned in alignment with the center line of the rod 102 whereby to eliminate or minimize inaccuracies in the use of the indicator 100.

The indicator 100 may take any suitable form comprising a body 122 which may be affixed by means of a thumb nut 124 to a threaded extension of a boss 126 which passes through the portion 114 of the extension fitting. The indicator 100 is of the commercially available type, and comprises a triangular flat shaped body 122, having a calibrated scale 128 formed at one end, having a pointer 130 movable therebetween, and a working point 132 extending outwardly from the opposite end.

The point 132 operates the pointer 130 in the conventional manner.

In FIGURES 6 through 10 are shown a series of operations whereby the working point 132 of the indicator 100 is first positioned on the projected center line of the rod 102 in a plane parallel to the indicator 100. In FIGURE 7, the saddle 18 is moved on the standard 14 so as to position the point 132 of the indicator 100 on the top surface 80 of a work piece 70. The thumb nut 124 and extension mounting piece 114 are first manipulated via the cylindrical portion 112 so as to approximately position the point 132 on the projection of the center line of the rod 102 in a plane perpendicular to the plane of the indicator body 100.

Then, by moving the indicator via the vernier screw 24 slowly downwardly into engagement with the surface 80 until the pointer 130 reaches the middle point of the scale 128, a first reading may be taken on the vernier. Thereafter the height gauge is moved away from the surface 80 and the tool holder is rotated 180° to move the indicator into the position shown in FIGURE 8. A flat block 134 having a flat under surface 136 is then positioned on the top surface 80 of the work piece 70 in a manner whereby the surface 136 projects outwardly from the block 70 in order to project the top surface 80 outwardly. The indicator 100 is then moved again slowly upwardly into engagement with the surface 136 until the pointer 130 reaches the middle point of the scale 128. A second vernier reading is then taken. One-half of the difference of the vernier reading is the center line of the rod 102. The height gauge is moved away from the surface 136, the vernier is set on the half way point, the tool holder is rotated 180° to move the indicator back to the position shown in FIGURE 7. The point 132 of the indicator 100 is positioned on the top surface 80 of work piece 70. The indicator 100 (without moving the vernier setting) is moved into engagement with the surface 80 until the pointer 130 reaches the middle point of the scale 128. The point 132 is now exactly positioned on the projected center line of the cylindrical rod 102 in the plane perpendicular to the plane in which the flat body 122 of the indicator lies in the position shown in FIGURES 7 to 10, inclusive.

Since, as described in connection with FIGURE 6, the point 132 has previously been positioned on the projected center line of rod 102 in a first plane, the point 132 is now positioned on the line formed by two intersecting planes which line is a projection of the center line of rod 102 and hence, the point 132 will remain on the projected center line or rod 102 regardless of the position of orientation of the indicator. After this, very exact and minute measurements may be made on undercut surfaces 74 and 76, as shown in FIGURES 9 and 10, merely by rotating the indicator 100 by virtue of the universal mounting in the tool holder 34.

As will be obvious, I have by my invention provided a universal mounting for a marking or measuring tool in a height gauge whereby a plurality of accurate markings or measurements may be made without the necessity for removing and remounting the tool.

What I claim is:

1. A height gauge comprising a base, a standard upstanding thereon, a slide mounted on said standard, a tool holder carried on said slide, a tool mounted for rotation in said holder, said tool including a cylindrical portion, said cylindrical portion being received in a bore formed in said tool holder, said holder having a notch intersecting said bore, a wheel mounted on said cylindrical portion and received in said notch to facilitate rotation of said tool and cooperable means on said wheel and said tool holder to releasably fix said tool in said holder in selected positions of rotation.

2. The height gauge of claim 1, wherein said tool is a scriber having its working surface formed on the center line of rotation of said cylindrical portion, and wherein the scribing point of said scriber is also positioned on said center line and is formed by a pair of convergent surfaces having predetermined included angle therebetween.

3. The height gauge of claim 1, wherein an indicator is adjustably mounted on the forward end of said cylindrical portion whereby the point of said indicator may be positioned on the center line of rotation of said cylindrical portion.

References Cited in the file of this patent

UNITED STATES PATENTS

| | | |
|---|---|---|
| 1,321,312 | Joose | Nov. 11, 1919 |
| 1,942,118 | Pignone | Jan. 2, 1934 |
| 2,354,137 | Nystrom | July 18, 1944 |
| 2,611,968 | Brown | Sept. 30, 1952 |
| 2,697,283 | Leuthold | Dec. 21, 1954 |